Aug. 6, 1935.   F. B. YINGLING   2,010,125
LOCOMOTIVE
Filed July 2, 1932   7 Sheets-Sheet 1
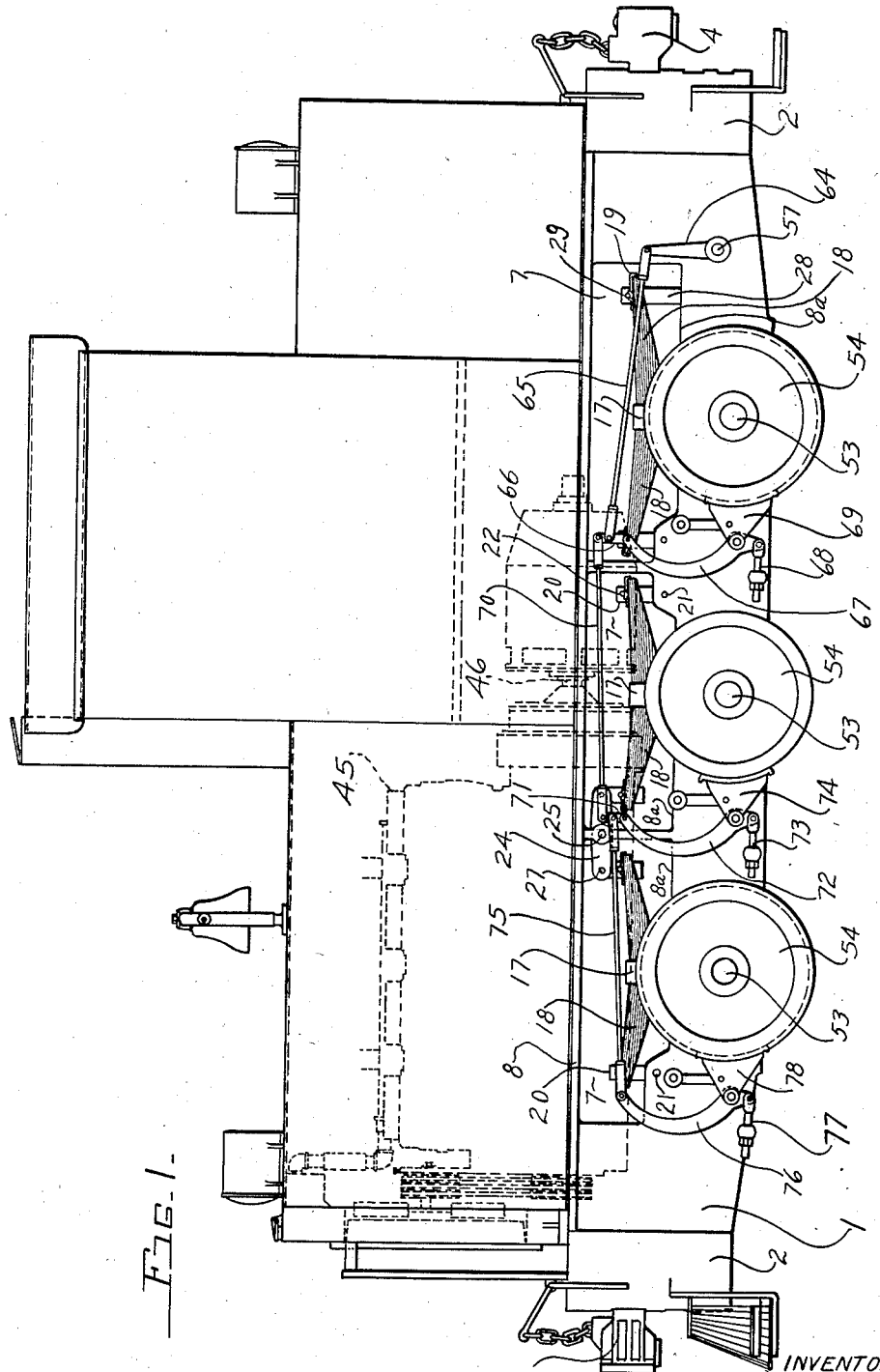
INVENTOR
Frank B. Yingling
BY
Toulmin & Toulmin
ATTORNEYS

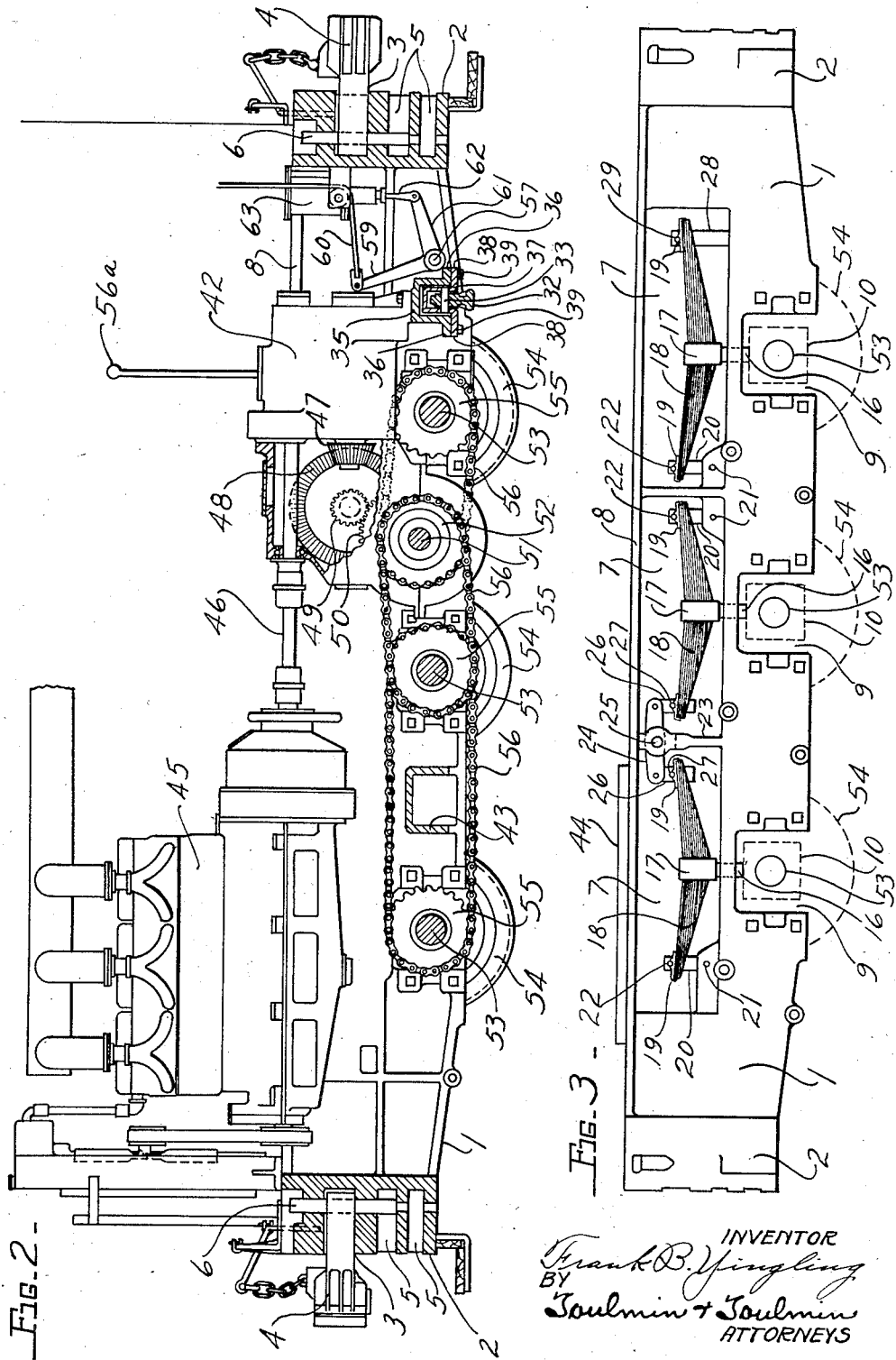

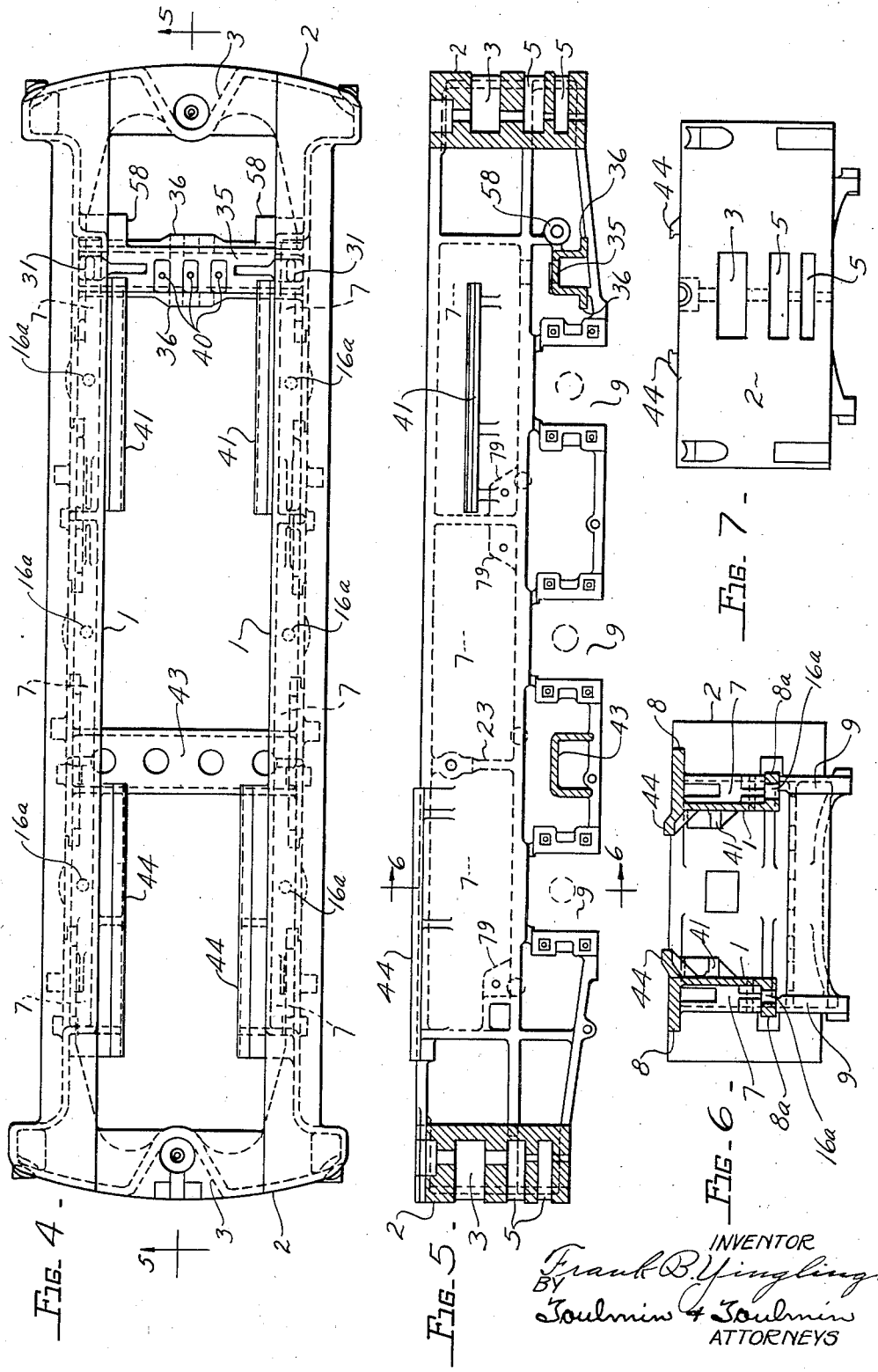

Aug. 6, 1935.    F. B. YINGLING    2,010,125
LOCOMOTIVE
Filed July 2, 1932    7 Sheets-Sheet 4
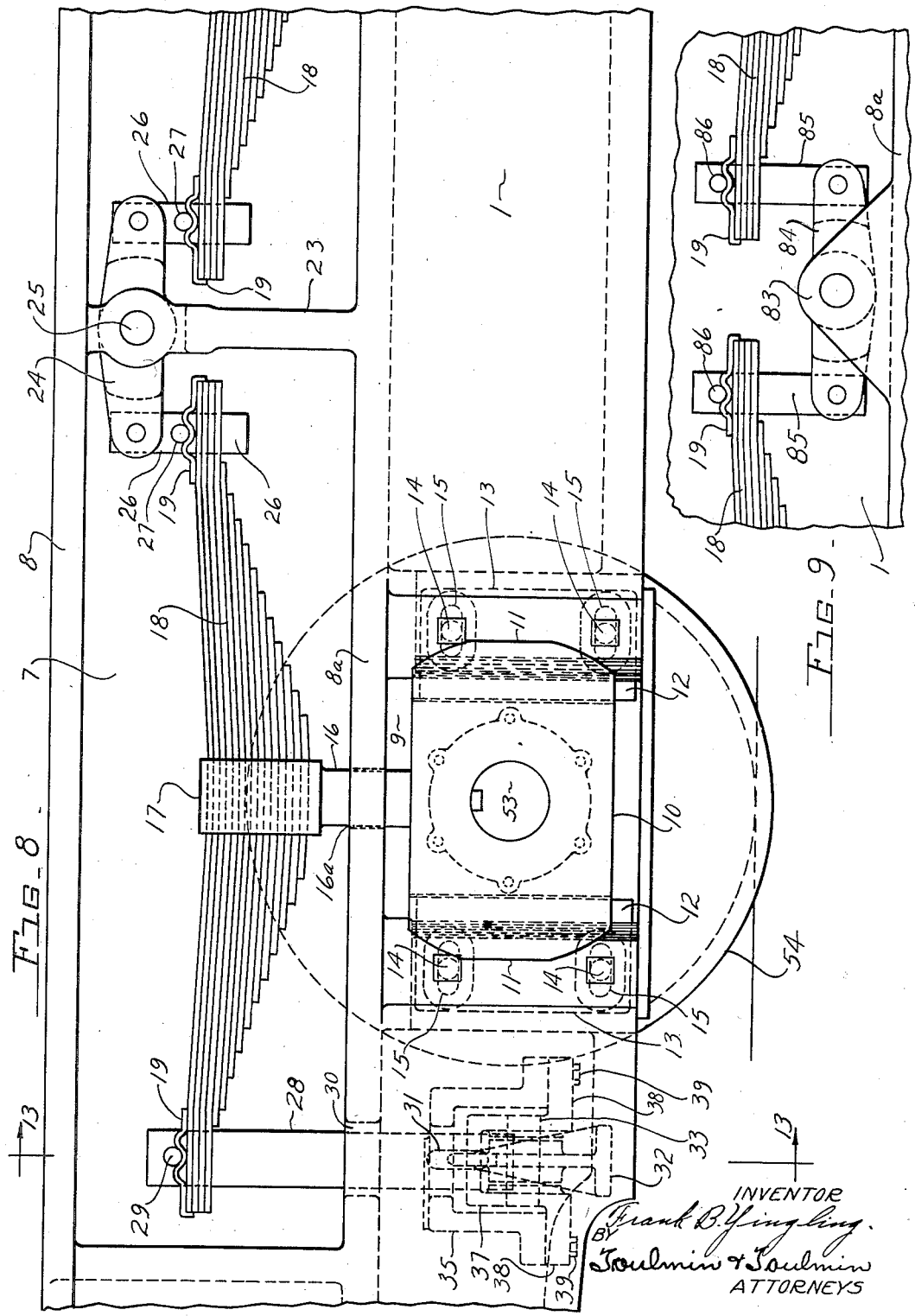
INVENTOR
Frank B. Yingling.
BY
Toulmin & Toulmin
ATTORNEYS

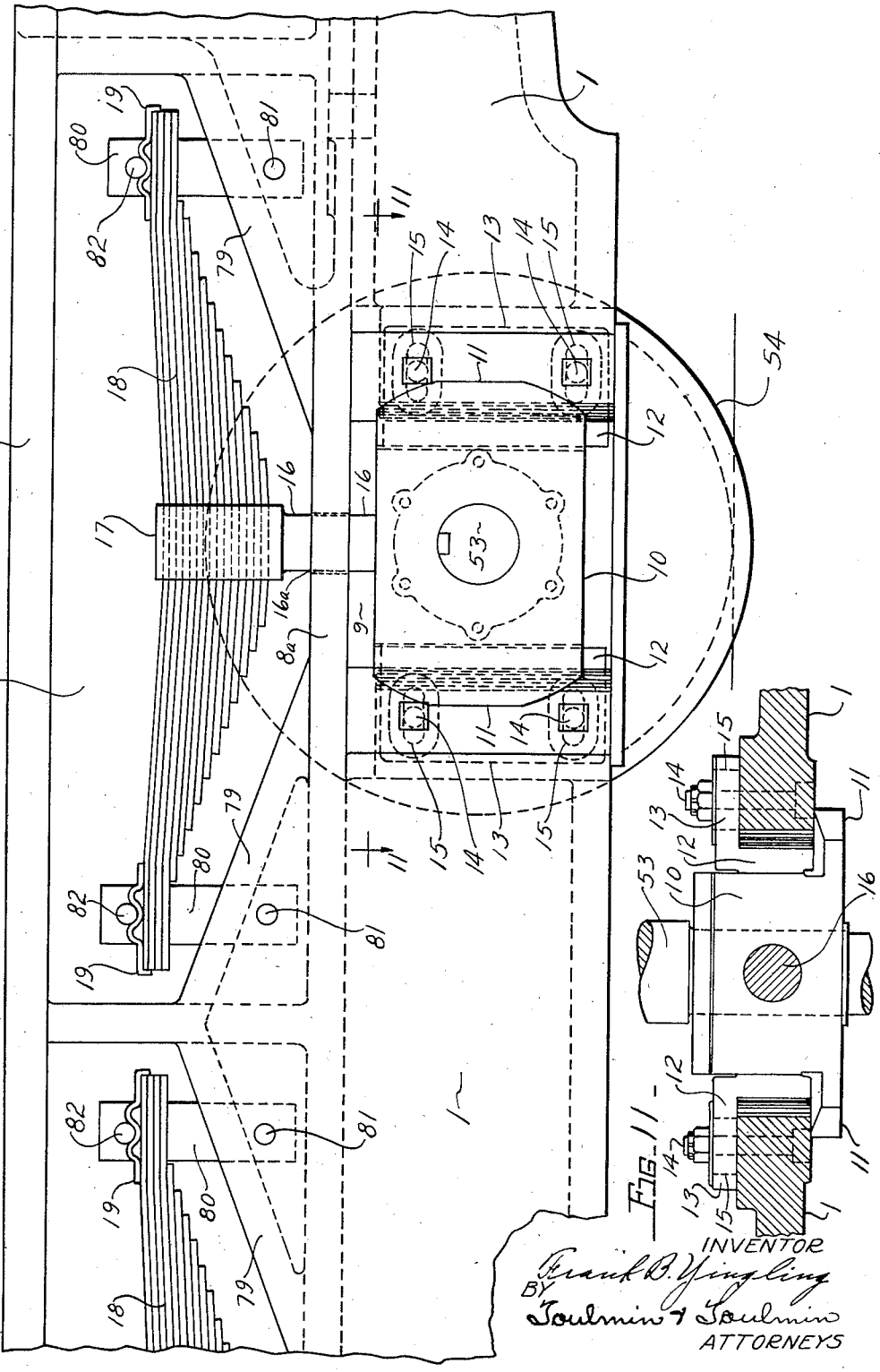

Aug. 6, 1935.  F. B. YINGLING  2,010,125
LOCOMOTIVE
Filed July 2, 1932  7 Sheets-Sheet 6
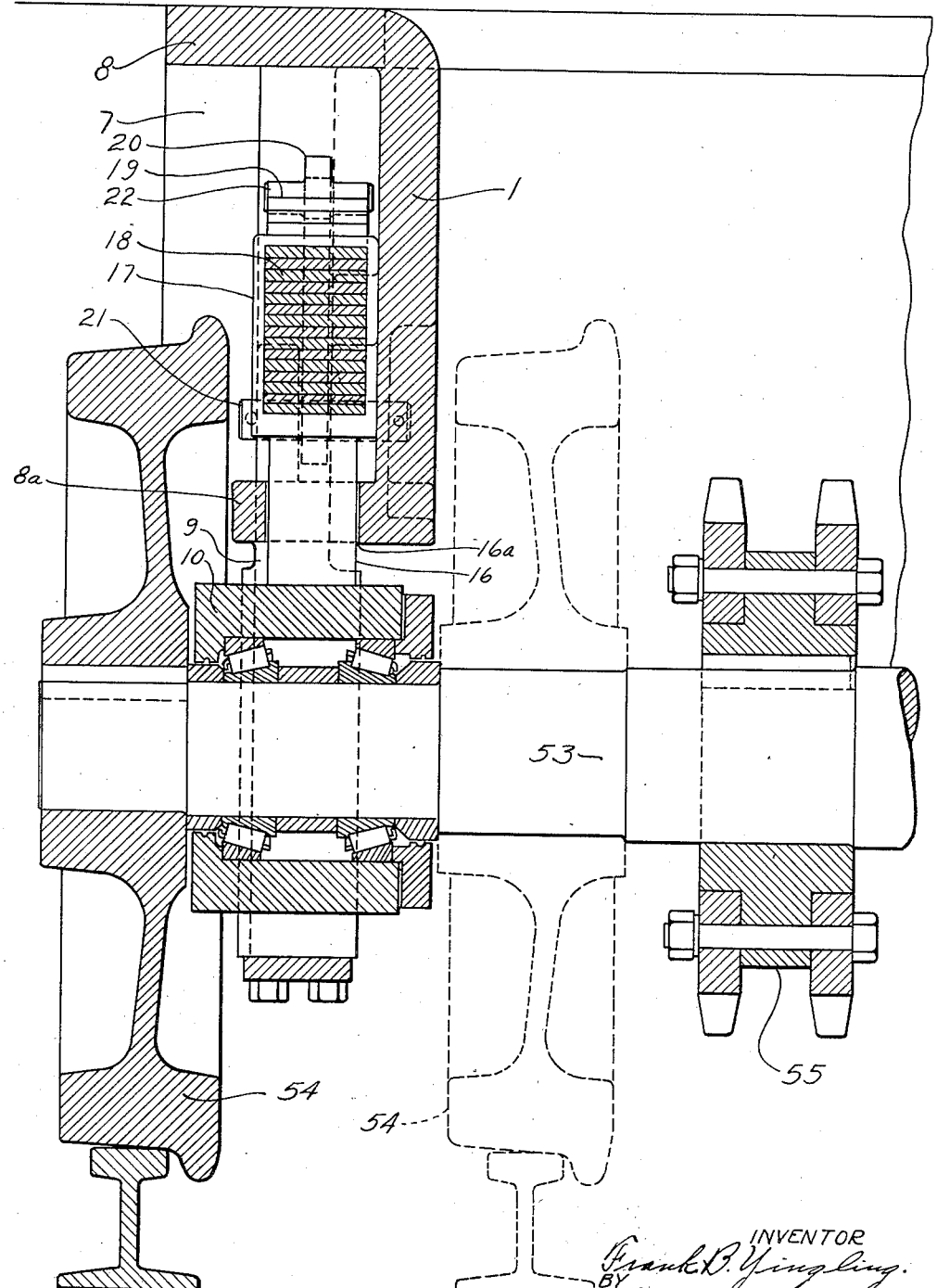

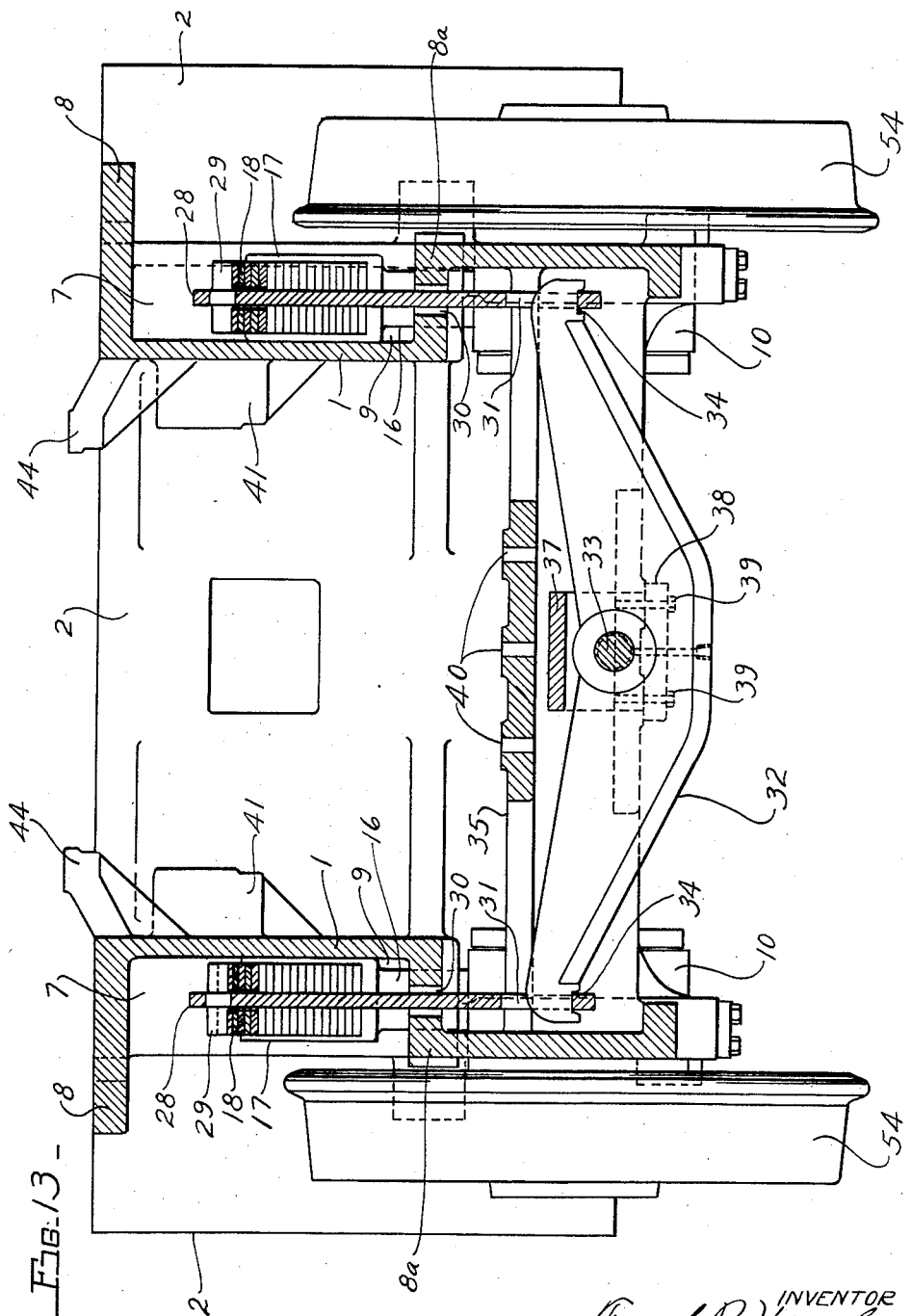

Patented Aug. 6, 1935

2,010,125

UNITED STATES PATENT OFFICE 2,010,125

LOCOMOTIVE

Frank B. Yingling, Hamilton, Ohio, assignor to The Ceramic Machinery Company, Hamilton, Ohio, a corporation of Ohio Application July 2, 1932, Serial No. 620,658

2 Claims. (Cl. 105—172)

This invention relates to improvements in locomotives, and has for its object to provide an integral frame for supporting a motor and transmission gears for operating a locomotive.

It has for its object to provide a frame comprising side members having in their outer faces depressions or pockets, in which resilient members are mounted for resiliently and yieldingly supporting the frame in connection with the usual wheel and axle construction.

It is also an object of this invention to provide, in connection with a frame, a plurality of pockets or depressions in the frame, axles with wheels thereon for supporting the frame, and means in the depressions supported by the axles for yieldingly supporting the frame upon the axles.

It is a further object of this invention to provide, in connection with an integral rectangular frame, means located in the outer surfaces of the frame for housing and containing resilient supporting members for the frame, and means on the inside of the frame for supporting an engine, gear casing and other operating structure.

It is also an object of this invention to provide means whereby a locomotive may be resiliently supported by a plurality of springs on each side, said springs on each side being interconnected for equalizing the support on each side, and an equalizer lever connecting certain of the springs on one side of the locomotive to a spring on the other side, so there is an equalization of the spring support.

The advantage of my construction is that I provide a one-piece frame of the requisite weight and strength for locomotive use, with the springs on the outside of the frame with their equalizing mechanism, the frames and equalizing mechanism being set back in recesses, preferably on the exterior of the frame, although they may be so located on the interior of the frame. This provides a unitary chassis construction, the movements of which do not interfere with the mechanism mounted on the ledges of the frame on the interior of the frame; and there is the further advantage in providing longitudinal equalization of the springs and transverse equalization, as this type of locomotive is used frequently on irregular tracks where there is a large amount of irregularity in the rails with respect to one another and longitudinally.

I further provide load supporting girders as a part of the integral frame, which girders provide recesses for the springs without destroying the strength of the frame; and I provide below these side girders thrust aprons which are recessed to receive the journal boxes and axles.

These and other advantages will appear from the following description taken in connection with the drawings.

Referring to the drawings:

Figure 1 is a side elevation of the lefthand side of a locomotive according to the present invention.

Figure 2 is a vertical, longitudinal section through the frame support of the locomotive, showing the motor and a part of the running gear supported on the frame.

Figure 3 is a side elevation of one side of the frame, showing the means by which the springs are attached to the frame and supported by journal boxes.

Figure 4 is a top plan view of the locomotive frame.

Figure 5 is a vertical, longitudinal section through the frame, with the motor and the running gear removed therefrom.

Figure 6 is a section on the line 6—6 of Figure 5.

Figure 7 is an end view of the frame.

Figure 8 is an enlarged view of one side of the frame, showing the manner in which the frame is supported by a wheel and axle and the manner in which the supporting spring is connected to the journal box, resting on the axle and to one side of the frame and to an equalizer lever.

Figure 9 shows a modified form of attaching the springs to the frame.

Figure 10 is a view showing one part of the frame supported on a wheel and axle, and another means by which the spring is connected to the frame.

Figure 11 is a section on the line 11—11 of Figure 10.

Figure 12 is a vertical section through one side of the frame, showing the relation between the frame and the wheel and axle. This figure shows in full line a wheel on the end of the axle outside of the side member, and in dotted line a wheel on the axle on the inside of the side member.

Figure 13 is a section on the line 13—13 of Figure 8.

The frame for supporting the locomotive is cast integrally and consists of a pair of side plates 1 and ends 2, integral with the side plates. In each end there is provided a pocket or slot 3, in which is located a drawhead 4. Below the pocket or slot 3 is a plurality of slots 5, adapted to receive a link or some other coupling mechanism.

The links and the drawhead are held in position in their respective pockets or slots by means of a vertical pin 6 extending through a suitable hole in the end for that purpose.

Each side plate or member has on its outer face a longitudinally extending pocket or recess 7. The upper edge of each side member has extending over the pocket or recess a lateral flange 8. This flange serves to protect the mechanism located within the recess or pocket. The part of the side member at the lower edge of the pocket or recess is formed into a ledge-like structure 8a.

In the lower edge of each side member is a plurality of recesses or rectangular notches 9, adapted to receive journal boxes 10, one journal box for each recess. Each journal box has on its front face laterally extending flanges 11 adapted to engage the outside face of the side member 1 when in position in the recess. Between the journal box and each wall of the recess is a spacer 12, which has extending laterally therefrom, away from the recess, a flange 13 by which the spacer may be attached to the side members of the frame by means of bolts 14 passing through the flange and the side member.

In order to permit an adjustment of the spacer longitudinally of the side member each flange 13 has longitudinally extending slots 15, through which the bolts 14 pass. Extending upwardly from each journal box is a pin 16, which passes through a hole 16a in the ledge 8a into the recess or pocket 7. The upper end of each pin or support 16 is attached by means of a clip 17 to the central part of a leaf spring 18. Each leaf spring has on its end a saddle 19.

In the locomotive as illustrated in Figure 3 there are three of these springs. Each end of one of these springs is attached to the frame by means of a link 20, pivoted at one end to a bracket 21. In the other end of each of these links is a pin 22, which rests in a notch provided therefor in the saddle 19. Between the two lefthand springs, as shown in Figure 3, there is a vertically extending rib 23 formed integral with the flange 8, the ledge 8a and the bottom of the recess.

To the upper end of this rib a lever 24 is pivoted at its central point 25. To each end of this lever is pivoted one end of a link 26. The other ends of these links extend through slots in the ends of the springs and have thereon pins 27 resting in the adjacent saddles of these two springs. This lever 24 and it connection with the springs provide a compensating relation between these two springs. The second end of the righthand spring has connected thereto a link 28, which has in one end a pin 29 resting in a seat on the saddle 19. This link 28 extends down through a hole 30 in the ledge 8a, and has in its other end a slot or hole 31. There is one of these links 28 on each side of the frame at the rear of the locomotive.

These links have their lower ends attached to a cross equalizer lever 32, pivoted on a short shaft 33. On each end of the equalizer lever is a notch 34, which receives the part of the link 28 at the lower end of the slot 31.

Extending from one side member to the other adjacent the rear of the truck frame is a transverse U-shaped cross beam 35, which has on each edge a flange 36. Within this U-shaped cross beam, and at the center thereof, is a U-shaped member 37 which serves as a support for the shaft 33 of the equalizer lever. This U-shaped member has laterally extending flanges 38, attached to the flanges 36 by means of bolts 39. By this means the equalizer lever is supported pivotally by the transverse U-shaped beam 35. In and adjacent the center of the U-shaped transverse beam are holes 40, by means of which some part of the running gear may be attached to the frame. This transverse beam is located beneath the ledges 8a, and somewhat above the lower edge of each side member.

Extending along the inside of each side member, opposite but above the ledge 8a, is a ledge 41, which cooperates with the cross beam in supporting part of the running gear mechanism. These ledges and cross beam are used for supporting a housing 42, in which the transmission and the gear shift mechanism are located. Between the middle and the front end of the frame is a second cross beam 43, used for supporting any part of the operating mechanism.

Located at the front and the upper edge of each side of the frame are ledges 44, upon which a motor 45 is supported and to which it is attached. Extending from the motor is the usual drive shaft 46, extending into the housing 42. By means of suitable gearing located in the housing, a shaft with a gear 47 thereon are caused to rotate. This gear 47 meshes with a second gear 48 for rotation. Connected integrally with the gear 48 is a pinion 49, which meshes with a third gear 50 located on a shaft 51 supported by the frame transversely thereof.

On this shaft 51 are sprocket wheels 52. The axles for supporting the frame and the locomotive structure are indicated by the numeral 53, and each has thereon a wheel 54. Each axle has one or more sprocket wheels 55, rigidly attached thereto. These sprocket wheels are connected to each other and to the sprocket wheels 52 on the shaft 51 by means of sprocket chains 56. It is through the above-mentioned gear structure and the chains and sprocket wheels that power is transmitted from the motor shaft 46 to the wheels and axles. The gear shift lever is indicated by the numeral 56a.

Extending transversely of the rear end of the frame and supported by means of bearings 58 is a brake shaft 57. This shaft has extending upwardly therefrom at some point between the side members, an arm or lever 59, to the end of which is attached one end of a cable or chain 60 for causing the brake shaft to rotate. There is also extending from this brake shaft, adjacent the lever 59, a second lever 61, which has attached to its end a piston rod or plunger 62 which projects into a cylinder 63 for operating the brake mechanism.

On each end of the brake shaft and on the outside of the frame is a lever 64. To the free end of this lever is attached one end of a link 65. The other end of this link is attached to the middle point of a short lever 66. One end of this lever 66 is attached to a brake lever 67, adjustably and pivotally supported at one end by a support 68. To this lever, adjacent the support 68, is attached a brake shoe 69 adapted to engage one of the wheels 54 for braking purposes.

To the other end of the short lever 66 is attached one end of a link 70, the other end of which is attached to one end of a second short lever 71. The other end of this short lever 71 is attached to one end of a brake lever 72, which has its other end adjustably and pivotally attached to a support 73 adjacent the lower edge of one side of the frame. To the brake lever 72 adjacent its support 73 is attached a brake shoe 74.

Intermediate the ends of the short lever 71 is pivotally attached one end of a link 75, the other end of which link it attached to one end of a brake lever 76, which is pivoted at its other end to an adjustable support 77 attached to one side of the frame. To this brake lever 76, adjacent the support 77, is attached a brake shoe 78. The links 65, 70 and 75 are adjustable so that each brake shoe may properly grip the wheel adjacent which it is located.

In the form shown in Figure 10 the springs are attached to the side members by means of brackets 79, to each of which is pivoted one end of a link 80 at the point 81. The other ends of these links have therein pins 82 for engaging seats in the saddles on the ends of the springs. In the form shown in Figure 9 the ends of certain springs are supported on a bracket 83 located on the ledge 8a. To this bracket is pivoted, at its center, a lever 84. To each end of this lever 84 is pivotally attached one end of a link 85. The other ends of these links have pins 86 for engaging the seats in the saddles at the ends of the springs.

In Figure 12 the wheel is shown in solid line located on the end of the axle without the frame. The wheels are thus located for broad gauge road purposes. If the locomotive is to be used in connection with a narrow gauge road the wheels may be located as shown in dotted line on the axle on the inside of the side members. This figure also shows the manner in which the journal box is mounted upon the axle. It also shows the relation between the journal box and the supporting pin 16, the clip 17 and the spring 18.

It is desired to comprehend within this invention such modifications as may be embraced within the claims and the scope of the invention.

Having thus fully described the invention, what is claimed as new and desired to be secured by Letters Patent, is:

1. In a locomotive, in combination with an axle, a journal box supported on each end of the axle, a support member extending up from each journal box, a frame having side plates with depressions therein forming ledges, a spring on each side of the frame attached at one end to the frame and intermediate its ends to one of the support members, and an equalizer lever pivoted to the frame and connected at each end to the other end of one of the springs, said ledges forming guides on the frame for the support members.

2. In a locomotive, in combination with an axle, a journal box supported on each end of the axle, a support member extending up from each journal box, a frame, said frame having side plates with depressions therein forming ledges, a spring on each side of the frame attached at one end to the frame and intermediate its ends to one of the support members, an equalizer lever pivoted to the frame and connected at each end by a link to the other end of one of the springs, said ledges forming guides on the frame for the support members, and a guide on the frame for each journal box.

FRANK B. YINGLING.